(12) United States Patent
Dhananjay et al.

(10) Patent No.: US 9,912,510 B2
(45) Date of Patent: Mar. 6, 2018

(54) SYSTEM AND METHOD FOR MITIGATING FREQUENCY OFFSETS IN WIRELESS SYSTEMS

(71) Applicant: New York University, New York, NY (US)

(72) Inventors: Aditya Dhananjay, Brooklyn, NY (US); Sundeep Rangan, Jersey City, NJ (US); Dennis Shasha, New York, NY (US)

(73) Assignee: NEW YORK UNIVERSITY, New York, NY (US)

( * ) Notice: Subject to any disclaimer, the term of this patent is extended or adjusted under 35 U.S.C. 154(b) by 0 days.

(21) Appl. No.: 15/247,113

(22) Filed: Aug. 25, 2016

(65) Prior Publication Data

US 2017/0063590 A1 Mar. 2, 2017

Related U.S. Application Data

(60) Provisional application No. 62/210,786, filed on Aug. 27, 2015.

(51) Int. Cl.
*H04L 27/26* (2006.01)
(52) U.S. Cl.
CPC ...... *H04L 27/2662* (2013.01); *H04L 27/2602* (2013.01); *H04L 27/2675* (2013.01)
(58) Field of Classification Search
CPC .......... H04L 27/2675; H04L 27/2657; H04L 27/2659; H04L 27/266
See application file for complete search history.

(56) References Cited

U.S. PATENT DOCUMENTS 5,852,630 A * 12/1998 Langberg ............ H04L 27/2647
375/219
6,459,679 B1 * 10/2002 Kim ...................... H04L 5/0048
370/208

(Continued)

OTHER PUBLICATIONS

P. Moose, "A technique for orthogonal frequency-division multiplexing frequency offset correction", IEEE Trans. Comm'n, vol. 42, No. 10. p. 2908-2914, Oct. 1994.

*Primary Examiner* — David S Huang
(74) *Attorney, Agent, or Firm* — Andrews Kurth Kenyon LLP

(57) ABSTRACT

Exemplary communication apparatus can comprise a receiver; a computer arrangement; and a non-transitory medium comprising computer-executable instructions that cause the apparatus to: receive a signal comprising a plurality of symbols in a first domain; store a portion of the signal comprising at least one symbol in a buffer; determine a frequency offset parameter relating to the buffered portion; apply a correction signal based on the offset parameter to the buffered portion to generate an at least partially corrected signal in the first domain; and transform the at least partially corrected signal into a second domain. In some embodiments, the first domain is a time domain, the second domain is a frequency domain, and the symbols are OFDM symbols. The corrected signal can be further transformed into a third domain. Further, exemplary methods and computer-readable media can be provided embodying one or more procedures the apparatus is configured to perform.

30 Claims, 7 Drawing Sheets

(56) References Cited

U.S. PATENT DOCUMENTS

| | | | | |
|---|---|---|---|---|
| 7,613,104 B2* | 11/2009 | Bhatt | ............... | H04L 27/2656 370/208 |
| 2006/0233270 A1* | 10/2006 | Ahn | ............... | H04B 7/0851 375/260 |
| 2012/0027064 A1* | 2/2012 | Gupta | ............... | H04L 27/2647 375/224 |
| 2012/0281791 A1* | 11/2012 | Tsuchida | ............... | H04L 27/0014 375/343 |
| 2016/0006557 A1* | 1/2016 | Shirakawa | ............... | H04L 27/22 375/362 |
| 2016/0036524 A1* | 2/2016 | Yan | ............... | H04L 27/0014 398/25 |

\* cited by examiner

SYSTEM AND METHOD FOR MITIGATING FREQUENCY OFFSETS IN WIRELESS SYSTEMS

CROSS-REFERENCE TO RELATED APPLICATION(S)

This application is based upon and claims the benefit of priority from U.S. Patent Application Ser. No. 62/210,786, filed on Aug. 27, 2015, the entire disclosure of which is incorporated herein by reference.

FIELD OF THE DISCLOSURE

The present application relates to generally to the field of wireless communication systems, and more specifically to improving the performance of a communications apparatus or device (e.g., an orthogonal frequency division multiplexing (OFDM) receiver) by estimating, mitigating, correcting, and/or removing a large, rapidly-varying frequency offset present in a received signal.

BACKGROUND INFORMATION

An explosion in the number of wireless broadband users has led to a severe spectrum shortage in the conventional cellular bands. The demand for cellular data services is expected to grow at a staggering rate, necessitating orders of magnitude increases in wireless capacity. Millimeter wave (mmW) frequencies at 28, 38, and 60 GHz have been attracting growing attention as a possible candidate for next-generation microcellular networks. This band offers orders of magnitude greater spectrum and also allows for building high dimensional antenna arrays for further gains via beamforming and spatial multiplexing. Devices based on mmW have already hit the market, but are limited by their use of highly directional horn antennas to enable short-range, line-of-sight links, within a controlled and static environment, such as in a data center. Since such an environment and conditions are very difficult—if not impossible—to achieve in a practical system implement, there is a need for building mmW systems "in the wild," e.g., where line-of-sight is not always available, SNRs are lower, mobility is enabled, and the use of static directional antennas is infeasible. Exemplary embodiments of such mmW systems can be based on orthogonal frequency division multiplexing (OFDM) technology that is known to persons skilled in the art. Other exemplary embodiments can be based on Orthogonal Time Frequency & Space (OTFS)—a technique developed by Cohere Technologies and known to skilled persons—that transforms information carried in a delay-Doppler domain pair (also referred to as a "coordinate system") to the time-frequency domain pair utilized by modulation schemes such as OFDM.

One of the biggest challenges in building such real-world, systems is that frequency offsets in the received signal are unavoidable. Such frequency offsets can be caused by phase noise, imperfect oscillators, Doppler shifts, or a combination of these factors. These offsets have a deleterious effect on the wireless link quality, especially for OFDM and OTFS systems. Frequency offsets that are large (but stable) can easily be corrected by existing baseband processing techniques. However, rapidly varying offsets cannot be corrected efficiently, leading to non-trivial residual offsets. These residual offsets lead to inter-carrier-interference (ICI), which causes the OFDM subcarriers to lose their orthogonality. This problem is exacerbated when the symbol durations are longer, because the oscillators exhibit larger drifts over larger time-scales. The end result is increased symbol error rates.

Moreover, the effects of frequency offsets can be exacerbated for systems with higher operating frequencies, such as mmW systems. Exemplary effects of frequency offset on a received symbol constellation are illustrated in FIG. 3 for two cases: (a) negligible frequency offsets on a 2.4-GHz wireless link, and (b) significant frequency offsets on a mmW (e.g., 60-GHz) wireless link. While the receiver can easily detect the received symbols in FIG. 3(*a*), the frequency offset in FIG. 3(*b*) can lead to high symbol error rate. Furthermore, frequency offsets in mmW systems can exhibit not only high magnitudes (e.g., FIG. 3(*b*)) but also high variations over time-scales as short as a few microseconds. Accordingly, there exists a need to mitigate these large, highly-variable offsets such that the residual is small enough to maintain both the orthogonality of the OFDM subcarriers and the resulting error rate within acceptable bounds.

There are several existing techniques that fall short of meeting this need. Equalization is an exemplary frequency-domain technique that relies on known pilot symbols to be scattered throughout the data symbols in the received data packet. By estimating the channel (e.g., the effects of the transmission medium and the receiver) at these pilot locations, the receiver can determine the channel at non-pilot locations (through interpolation) and decode the data symbols by removing the channel estimates from the received signal. However, equalization is unable to cope with the magnitude of phase noise in mmW systems.

Reference phase tracking is another exemplary frequency-domain technique in which a known QPSK pilot signal ("reference") is applied to a particular subcarrier in every transmitted OFDM symbol. It estimates the phase rotation that the reference in symbol i has undergone relative to the reference phase observed in the previous symbol i−1. Once this phase rotation is measured for the reference, all the data-bearing subcarriers in symbol i are de-rotated by the same amount. Although this technique works well with small amounts of phase noise, the OFDM subcarriers lose their orthogonality as the phase noise is increased, and irreversibly interfere with each other before this technique can be applied.

Schmidl-Cox is an exemplary time-domain technique that measures the frequency offset on a per-packet basis using two reference OFDM symbols, and applies the correction to the remainder of the packet in the time domain, thereby eliminating ICI. This technique works well for large frequency offsets, but requires that they be relatively stable. As noted above, frequency offsets in mmW systems change significantly even on a per-symbol basis, rendering this technique incapable of correcting ICI.

Another exemplary method utilizes a feedback tracking loop comprising two components: a) frequency offset measurement, and b) frequency offset correction. Offsets can be measured either in the time domain (using the cyclic prefix), or in the frequency domain (using reference pilot symbols). In a closed loop system, this offset can be fed back to a numerically controlled oscillator (NCO), which can apply the correction in the time domain. If the offsets are stable, this technique can provide good gains, very similar to Schmidl-Cox. Since the feedback loop can be engineered to be quicker than the packet duration (unlike Schmidl-Cox), this technique can provide some gains over Schmidl-Cox.

The general structure of an exemplary feedback tracking loop is shown in FIG. 1. Signal 101 is a complex baseband (or intermediate frequency) time-domain sampled signal.

These samples can be multiplied with signal 109 using complex multiplier (or digital mixer) block 102, resulting in signal 103. The initial value in signal 109 can be 1+0i. The frequency offset in signal 103 can be measured by block 104 using any measurement technique including, but not limited to: a) measurement in the time-domain using the cyclic prefix, or b) converting signal 103 to a frequency domain and measure the frequency offset using pilot symbols or reference subcarriers. The offset value calculated by block 104 can be communicated using signal 105 to block 106, which can be a moving (or weighted) average filter. The filter output 107 can be the average measured frequency offset, and can be fed into block 108, an exemplary numerically controlled oscillator. Block 108 produces a sampled complex sinusoid (signal 109), the frequency of which can be substantially the negative of the frequency of signal 107. Frequency correction signal 109 can be digitally mixed with subsequent values of signal 101. Similar prior art systems applied the frequency correction in analog, in which NCO 108 and digital mixer 102 can be replaced by a voltage controlled oscillator (VCO) and analog mixer, respectively For correction in either digital or analog, this feedback tracking loop technique illustrated by FIG. 1 works well even for large offsets so long as they are stable. However, the problem with highly varying offsets is that by the time the offsets are calculated on signal 103 and the correction signal 109 is produced, the offsets would have changed significantly. Hence, there is need for a better technique to estimate and/or correct these frequency offsets when they vary more rapidly.

Since the frequency offset varies widely over a symbol period in an OFDM mmW system, symbols of shorter durations (i.e., smaller sizes of the FFT and inverse FFT used for demodulation and modulation, respectively) can be more resilient to phase noise. However, merely using a smaller symbol or FFT size is not practical. Outdoor mmW wireless links can have delay spreads as large as 300 ns. The cyclic prefix therefore should be at least this length in order to mitigate inter-symbol-interference (ISI). Reducing the overall symbol length (including the cyclic prefix) causes the cyclic prefix—which comprises overhead not usable for data symbols—to consume a larger portion of the symbol. For example, a cyclic prefix of 40 samples long (about 300 ns at 130×10⁶ samples/s), FFT sizes of 128, 256, 512, and 1024 have their cyclic prefix overheads as approximately 31.25%, 15.6%, 7.8%, and 3.9% respectively. As such, merely reducing the FFT size is not a practical solution for mitigating frequency offset in mmW OFDM systems.

Thus, there may be a need to address at least some of the inadequacies, issues, and/or concerns with existing mmW frequency offset correction techniques described above.

SUMMARY OF EXEMPLARY EMBODIMENTS

Accordingly, to address at least some of such issues and/or problems, certain exemplary embodiments of methods, systems, devices, and computer-readable media of the present disclosure can utilize a quick and accurate procedure to estimate, mitigate, correct, and/or remove large, rapidly varying frequency offsets present in a received signal. These exemplary embodiments may be referred to herein as "Iris." Such exemplary embodiments of methods, systems, devices, and computer-readable media of the present disclosure can vastly out-perform conventional methods, techniques, and systems in various known applications, including exemplary applications discussed herein.

In certain exemplary embodiments of the present disclosure, it is possible to provide a communication apparatus comprising a receiver; a computer arrangement; and a non-transitory, computer-readable medium comprising computer-executable instructions that, when executed by the computer arrangement, cause the apparatus to: (i) receive a signal comprising a plurality of symbols in a first domain; (ii) store a portion of the signal comprising at least one symbol in a buffer; (iii) determine a frequency offset parameter relating to the buffered portion; (iv) apply a correction signal based on the frequency offset parameter to the buffered portion to generate an at least partially corrected signal in the first domain; and (v) transform the at least partially corrected signal into a second domain. In some exemplary embodiments, the first domain is a time domain, the second domain is a frequency domain, and each of the plurality of symbols is an OFDM symbol. In some exemplary embodiments, the frequency offset parameter is determined based on a cyclic prefix comprising the buffered portion.

Further, in some exemplary embodiments, the instructions that cause the apparatus to determine the frequency offset parameter further cause the apparatus to compute a representation of the buffered portion in the second domain and determine the frequency offset parameter based on a plurality of reference elements comprising the representation of the buffered portion in the second domain. In some exemplary embodiments, the second domain is a frequency domain and the plurality of reference elements comprise at least one of pilot symbols and reference subcarriers. In some exemplary embodiments, the medium further comprises instructions that, when executed by the computer arrangement, cause the apparatus to estimate a residual frequency offset corresponding to the at least partially corrected signal in the second domain. In some exemplary embodiments, the medium further comprises instructions that, when executed by the computer arrangement, cause the apparatus to further transform the at least partially corrected signal from the second domain into a third domain. In some exemplary embodiments, the medium further comprises instructions that, when executed by the computer arrangement, cause the apparatus to estimate a residual frequency offset corresponding to the at least partially corrected signal in at least one of the second and third domains.

In some exemplary embodiments, the instructions that cause the apparatus to apply the correction signal further configure: (i) one of a numerically controlled oscillator (NCO), a voltage controlled oscillator (VCO), and a frequency modulator to generate the correction signal; and (ii) one of a complex multiplier and a digital mixer to perform a complex multiplication of the buffered portion with the correction signal in the first domain. Furthermore, exemplary methods and non-transitory computer-readable media can be provided embodying one or more procedures the communications apparatus and/or computer arrangement is configured to perform.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments, in which.

While the present disclosure will now be described in detail with reference to the figures, it is done so in connection with the illustrative embodiments and is not limited by the particular embodiments illustrated in the figure(s) or in the appended claims.

DETAILED DESCRIPTION OF EXEMPLARY EMBODIMENTS

Various exemplary embodiments of the Iris technique of the present disclosure can have the ability to estimate, mitigate, correct, and/or remove a large, rapidly-varying frequency offset present in a signal received by a communications apparatus or device, thereby improving the performance of such an apparatus or device. Moreover, various embodiments of the Iris technique of the present disclosure can accomplish these goals while remaining computationally efficient In some exemplary embodiments, Iris can be predominantly a time-domain processing that corrects the phase noise on a per-symbol basis. First, the received, time-domain samples of an OFDM symbol are buffered, and the average frequency offset across the symbol is measured using the cyclic prefix. Next, the time-domain samples of this symbol are held in the buffer for N+T clock cycles, where T is the number of samples in the symbol (including the cyclic prefix) and N is the number of clock cycles taken to calculate the average frequency offset after all the buffered samples of the symbol have been received. In some exemplary embodiments, N can be 45 samples. Next, after the average frequency offset of a symbol is estimated, the buffered symbol samples are de-rotated using, e.g., a numerically-controlled oscillator (NCO). Finally, the de-rotated samples can be provided for any further processing by the receiver. In other exemplary embodiments, Iris time-domain processing can be combined with reference phase tracking that was described above.

Various exemplary embodiments of Iris are extremely efficient in terms of both memory and processing resources. For example, Iris can be configured to use only buffer space necessary to store a single OFDM symbol (e.g., including the cyclic prefix). Moreover, Iris can be configured to use such buffer space only for the number of clock cycles (N) required to calculate the frequency offset in the symbol under measurement. After completion and until the next symbol begins, such buffer space can be used for other processing needs of the receiver. Furthermore, embodiments of Iris can comprise only two complex multipliers, a rectangular-to-polar converter, an accumulator, and an NCO. As such, Iris can be no more computationally complex than previous techniques.

Figure 1:
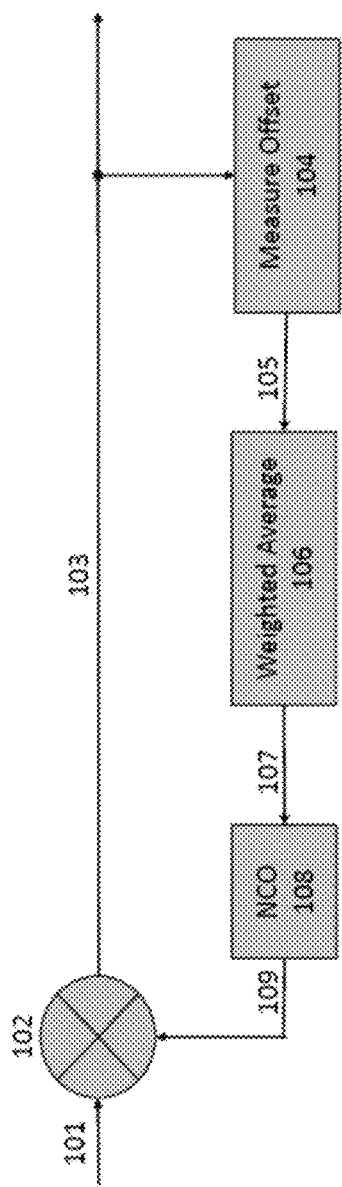
FIG. 1 is a block diagram of an exemplary, prior-art feedback tracking loop for estimating and/or correcting frequency offsets.
Figure 2:
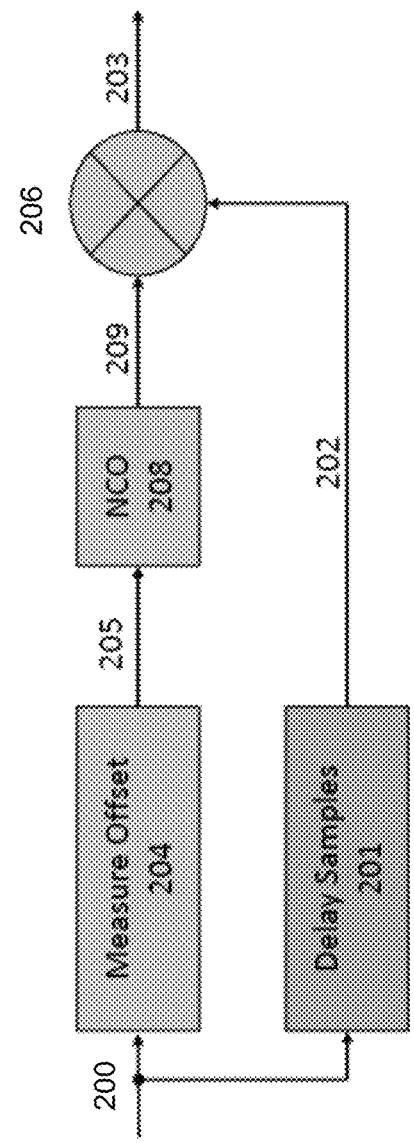
FIG. 2 is a block diagram of exemplary Iris time-domain processing for estimating and/or correcting frequency offsets in mmW systems, according to one or more exemplary embodiments of the present disclosure.
Figure 3B:
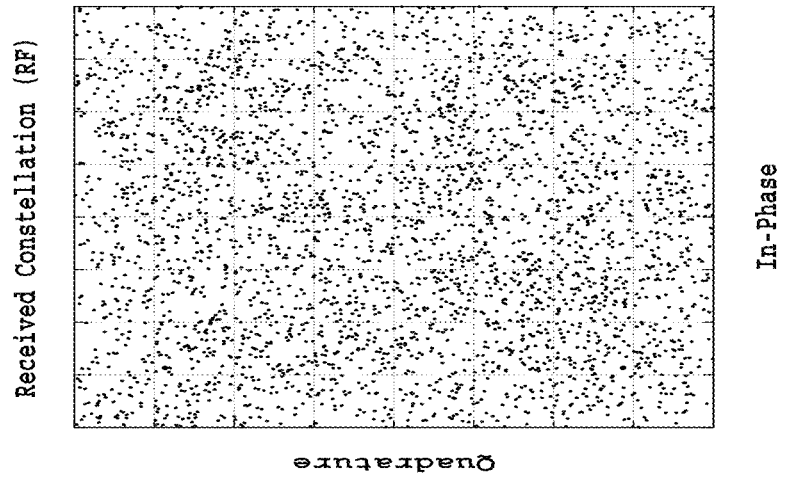
FIG. 3(b) is an exemplary graph of a received symbol constellation affected by exemplary frequency offsets on a mmW (e.g., 60-GHz) wireless link.
Figure 3A:
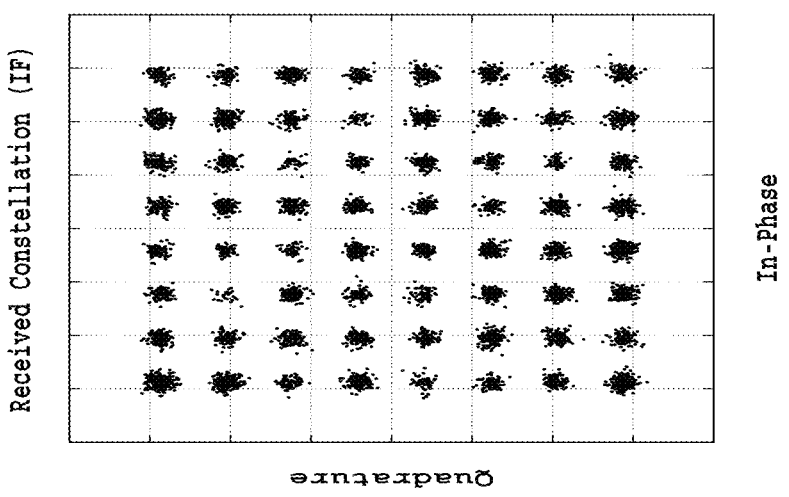
FIG. 3(a) is an exemplary graph of a received symbol constellation affected by negligible frequency offsets on a 2.4-GHz wireless link.
Figure 4A:
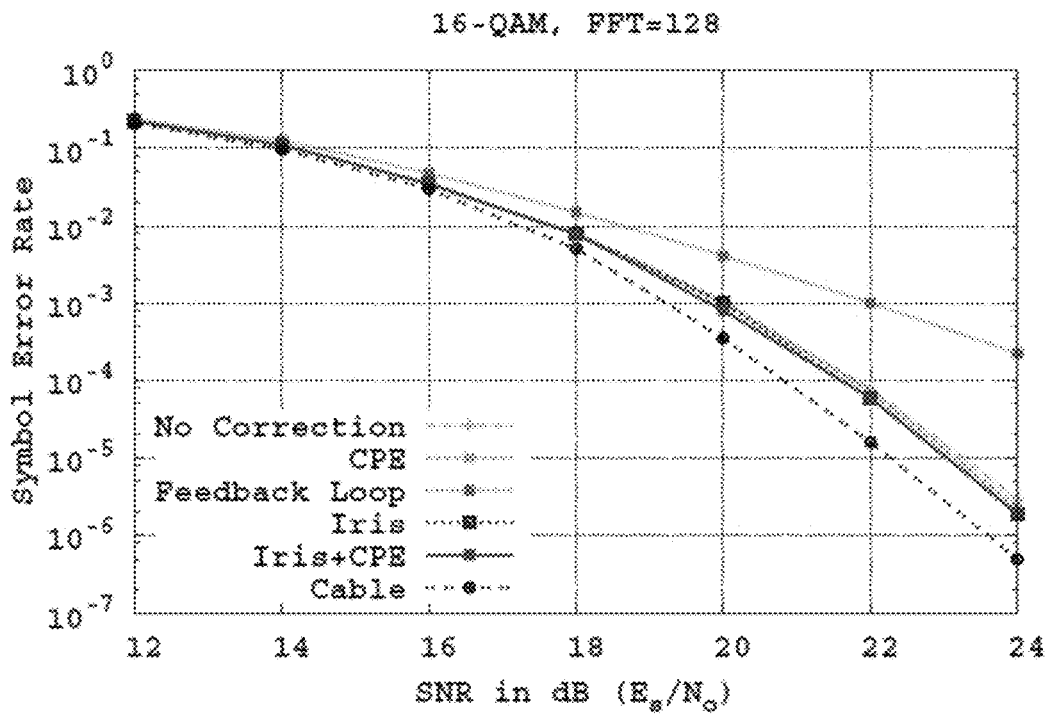
FIGS. 4(a)-(d) are exemplary graphs providing a comparison of 16-QAM symbol error rates between Iris and other exemplary methods for FFT sizes of 128, 256, 512, and 1024, respectively, according to one or more exemplary embodiments of the present disclosure.
Figure 4B:
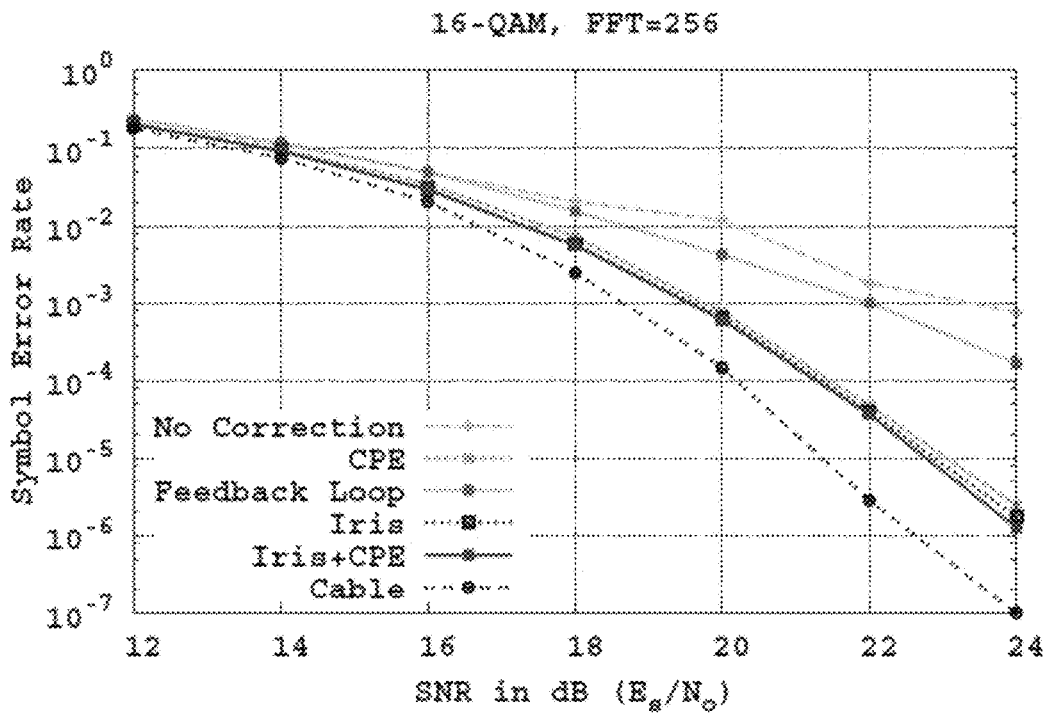
Figure 4C:
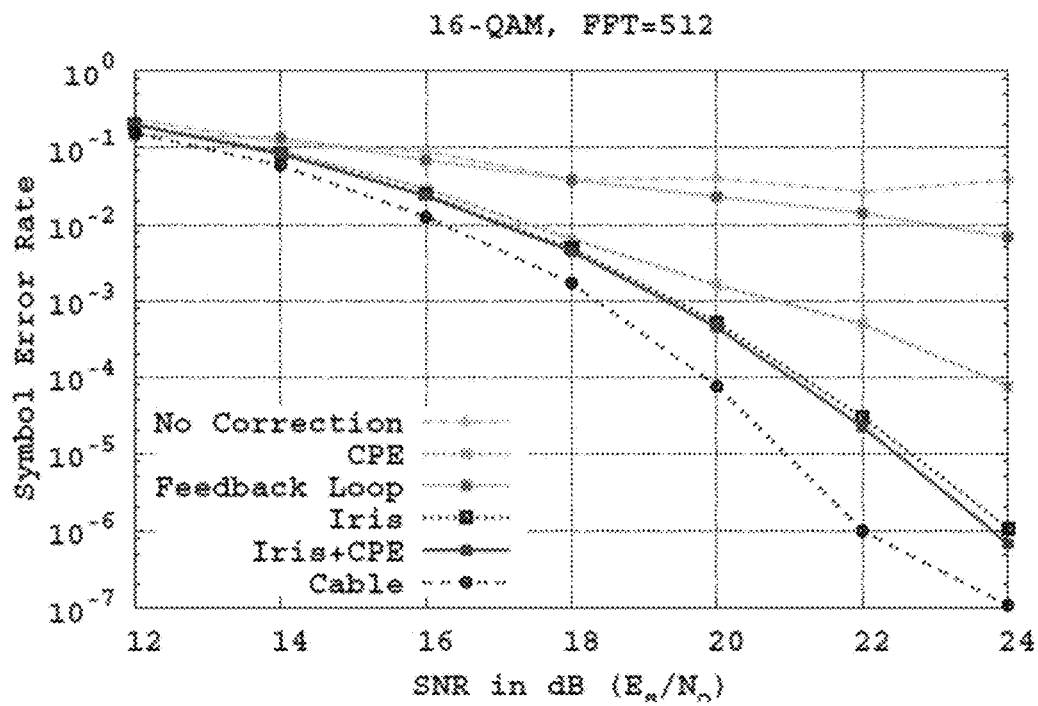
Figure 4D:
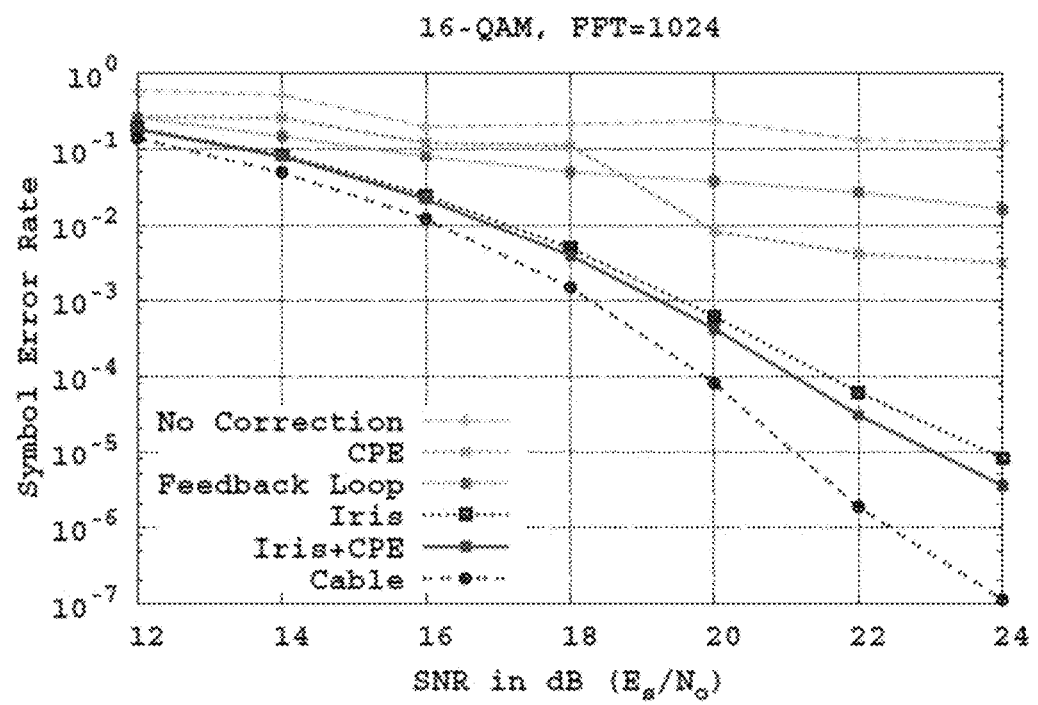
Figure 5A:
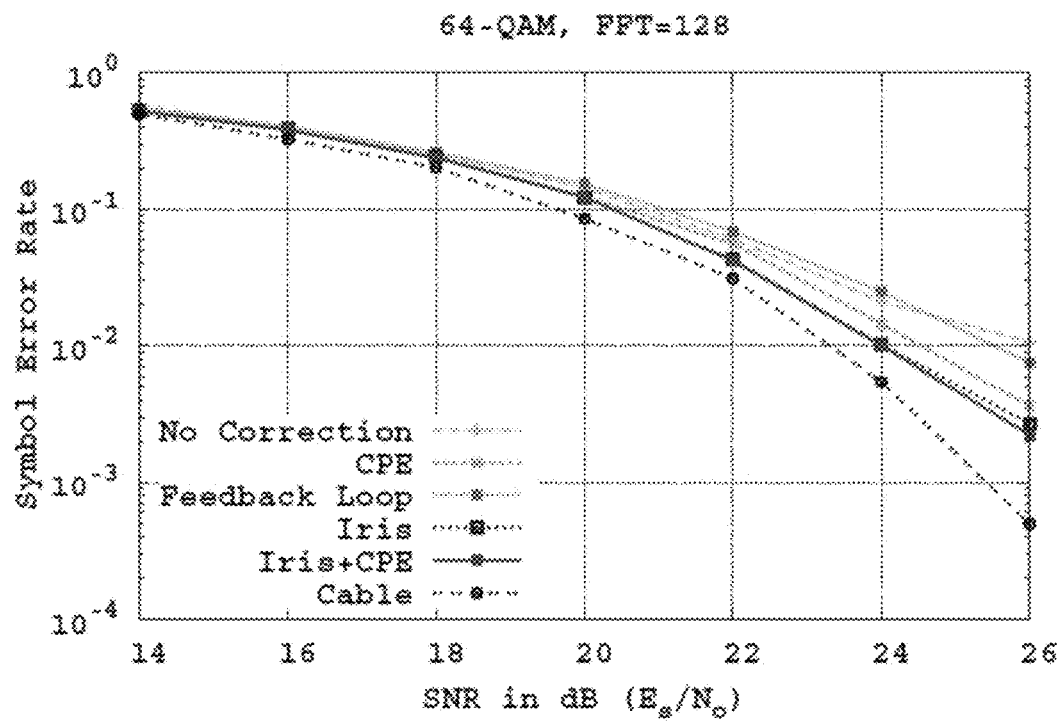
FIGS. 5(a)-(d) are exemplary graphs providing a comparison of 64-QAM symbol error rates between Iris and other exemplary methods for FFT sizes of 128, 256, 512, and 1024, respectively, according to one or more exemplary embodiments of the present disclosure.
Figure 5B:
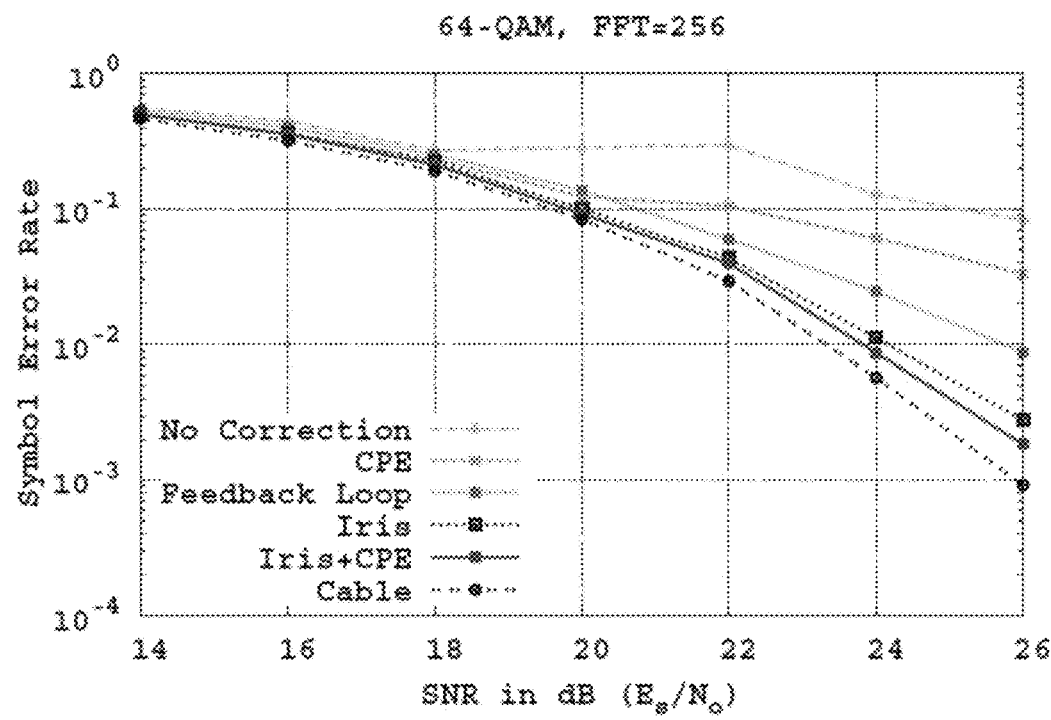
Figure 5C:
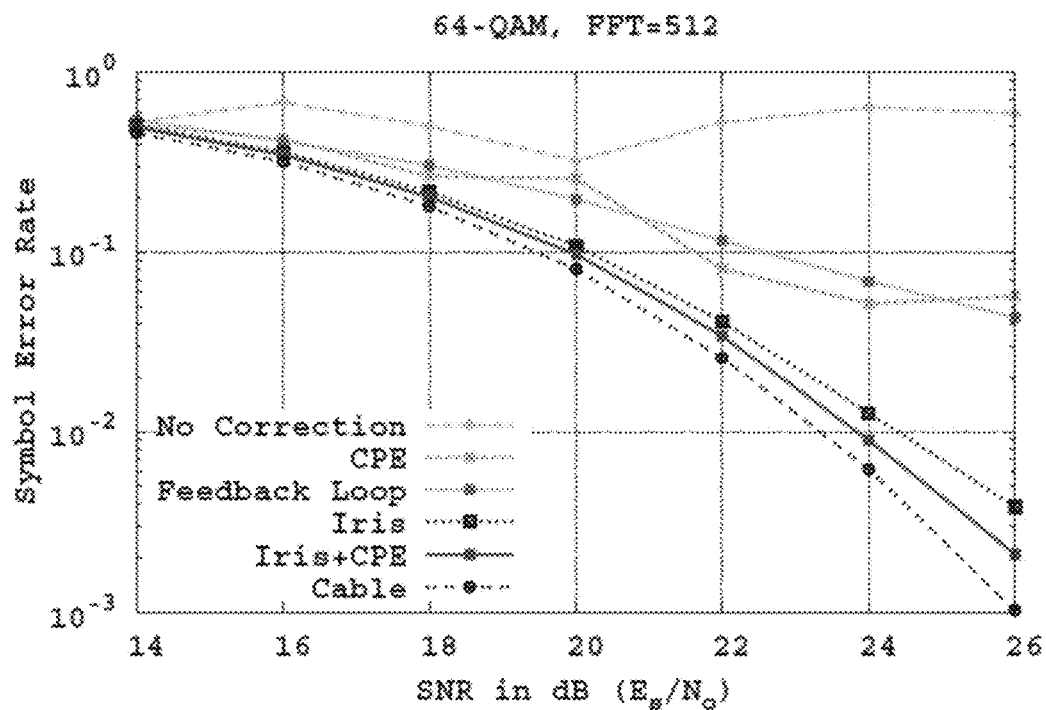
Figure 5D:
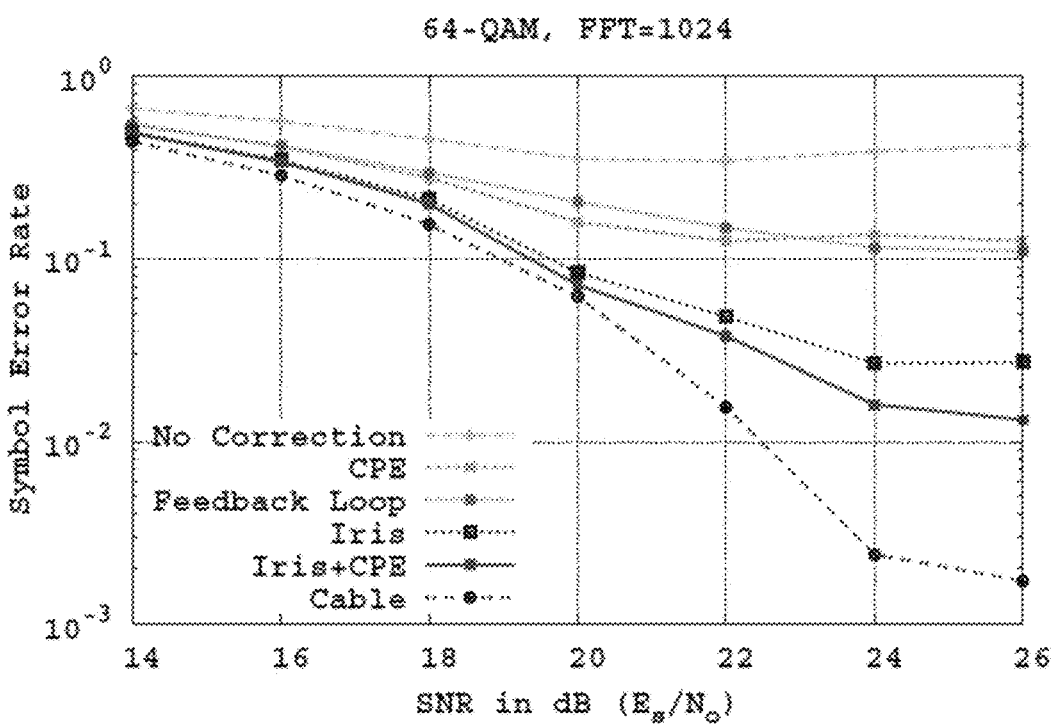

FIG. 2 is a block diagram illustrating one or more exemplary embodiments of Iris. In some exemplary embodiments, input signal 200 can be a complex, time-domain baseband signal, while in other exemplary embodiments signal 200 can be a complex, time-domain intermediate frequency (IF) signal. In either case, signal 200 can be buffered by block 201 to produce the delayed signal 202. Block 204 can measure the frequency offset in original (undelayed) signal 200, which it can output as signal 205. In some embodiments, signal 205 can represent the average frequency offset over the samples of cyclic prefix comprising signal 200. In some embodiments, the frequency offset measurement can be made in a time domain (using, e.g., a cyclic prefix) while in other embodiments this measurement can be made in a frequency domain (e.g., by measuring phase rotations on a reference subcarrier or a plurality of subcarriers). Numerically controlled oscillator (NCO) block 208 can generate a complex, time-domain sinusoidal correction signal 209. In some embodiments, the frequency of correction signal 209 can be the negative of the frequency indicated by frequency offset signal 205.

Signal 209 can be output by NCO block 208 to be used for further processing in the receiver, e.g., for use as an input to block 206 which can be a digital mixer or complex multiplier in some exemplary embodiments. For example, block 206 can remove an estimated frequency offset from the delayed signal 202 by multiplying time-domain samples of signal 209 with corresponding time-domain samples of delayed signal 202. The upper bound on the number of clock cycles required to estimate the frequency offset present in signal 200 and to provide the correction signal 209 to block 206 can be the delay applied by block 201. In some exemplary embodiments, this delay in block 201 can be substantially equal to this upper bound. In such cases, the frequency offset can be measured on a particular symbol and the correction signal 209 can be applied to the same symbol. As such, the overall effect of the exemplary embodiments illustrated in FIG. 2 is to mitigate frequency offsets in signal 200 that can be very large and/or can vary rapidly, while introducing a minimal delay in the processing of signal 200.

FIGS. 4 and 5 illustrate the performance of exemplary embodiments of Iris using various combinations of FFT size (128, 256, 512, and 1024 points) and modulation (16- and 64-QAM). The performance results shown in FIGS. 4 and 5 are based on a mmW OFDM reference system using field programmable gate arrays to implement Iris, among other functionality. The mmW wireless link operates at 60 GHz. Performance is measured in terms symbol error rate as a function of signal to noise ratio (i.e., the ratio of the energy per symbol to the noise floor). Each of the graphs in FIGS. 4 and 5 compare performance of Iris to the following other techniques No correction ("No Correction");
Iris time-domain correction ("TD Iris");
Common Phase Error (CPE) estimation, as described in P. Moose, *A technique for orthogonal frequency-division multiplexing frequency offset correction*, 42 IEEE TRANS. COMM'N, 2908-14, October 1994 ("CPE");
Iris time-domain combined with common phase error estimation ("Iris+CPE");
Feedback tracking loop (one-symbol delay) ("Feedback Loop"); and
Intermediate frequency (IF) over cable between transmitter and receiver, bypassing the 60-GHz mmW hardware ("Cable").

Various exemplary results are apparent in FIGS. 4 and 5. First, Iris yields significantly more benefit than the common phase error (CPE) technique proposed by Moose (also referred to hereinabove as "reference phase tracking"). However, the combination of Iris and Moose's CPE technique (Iris+CPE) produces the greatest reduction in symbol error rate. More generally, the relative gains are higher as the symbol durations increase, i.e., larger number of FFT points. At larger FFT sizes, Iris provides one to two orders of magnitude improvement in terms of symbol error rate compared to other techniques. Feedback tracking loops with one-symbol delay provide the worst performance of all correction techniques under comparison. Delaying the corrections by one symbol is the best-case behavior for feedback loops. Nevertheless, even when the corrections are applied just one symbol late, the symbol error rates are very high. As such, existing feedback tracking loop techniques are insufficient to combat the sheer amounts of frequency offsets present in mmW systems.

Exemplary embodiments have been described above in relation to an OFDM system, in which an FFT (e.g., OFDM demodulator) transforms a received signal—which may be at least partially corrected for frequency offset—from a time domain into a frequency domain, where further processing (e.g., CPE tracking or estimation, as discussed above). As discussed above, however, OFDM systems can also utilize high-dimensional antenna arrays for improving performance via beamforming and spatial multiplexing. Skilled persons will readily comprehend that embodiments of such systems can utilize multi-stage transforms involving domains other than time and frequency, such as a spatial domain. For example, in Multiple Input Multiple Output (MIMO) OFDM systems, time-domain samples received from a plurality of antennas can be transformed by a first FFT (e.g., of a first size) into a spatial domain and further by a second FFT (e.g., of a second size) into a frequency domain. In other exemplary embodiments, the order of transforms can be interchanged.

In addition to MIMO OFDM, exemplary embodiments of Iris can be utilized with other OFDM variants in which the received time-domain signal is transformed into at least one intermediate domain before being transformed into a final domain. Such variants include, but are not limited to Filter bank multi-carrier (FBMC); Generalized OFDM (GOFDM or GFDM); Discrete Fourier Transform (DFT) Precoded OFDM; Coded OFDM (COFDM); Band-Segmented Transmission OFDM (BST-OFDM); Universal Filtered Multicarrier (UFMC); Wideband OFDM (WOFDM); Flash OFDM; and Vector OFDM (VOFDM). In addition, exemplary embodiments of Iris can be utilized with OTFS (mentioned above), which can employ multi-dimensional and/or multistage techniques to transform received signals among time-frequency and delay-Doppler domain pairs.

Although exemplary embodiments discussed above comprise measuring the frequency offset of a buffered signal in a time domain (using, e.g., a cyclic prefix) or in a frequency domain (e.g., by measuring reference subcarriers and/or pilot symbols), such frequency offset measurements can be made in any domain into which the buffered portion of the signal can be transformed. Furthermore, frequency offset measurements can be made in a domain corresponding to any initial, intermediate, or final domain in which the received signal (corrected or uncorrected) can exist or be transformed. For example, if the received signal can be transformed from a first domain (e.g., time) into a second domain and further into a third domain, the frequency offset can be estimated in the second domain and the corresponding correction can be applied to the received signal in the first domain, resulting in a signal in which the frequency offset is at least partially corrected. Moreover, the at least partially corrected signal can be transformed into the second domain and, in some embodiments, further into the third domain. Further processing can (e.g., CPE estimation and/or tracking as discussed above) be applied in the second and/or third domain(s) to mitigate, reduce, and/or remove any residual frequency offset in the at least partially corrected signal.

Figure 6:
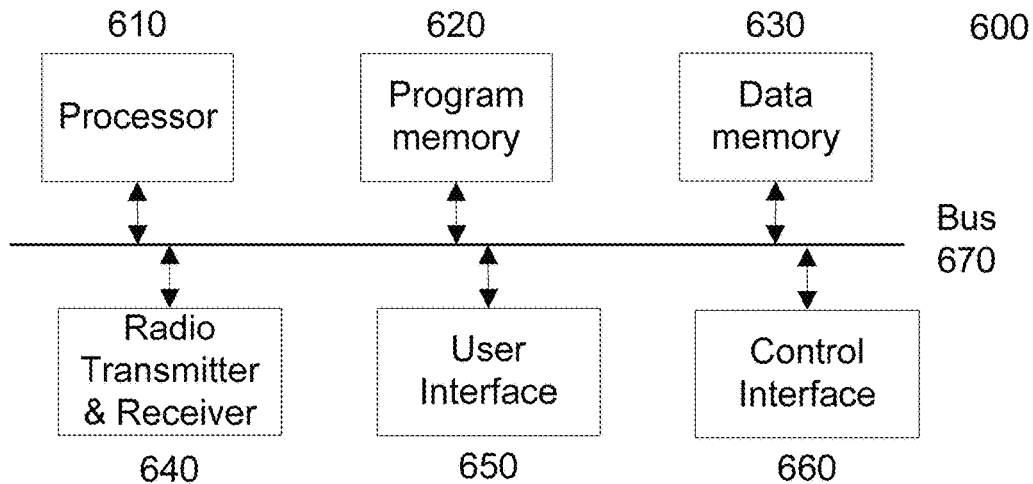
FIG. 6 is a block diagram of an exemplary communication device and/or apparatus according to one or more exemplary embodiments of the present disclosure.

Although various embodiments are described herein above as a combination of processing blocks, the person of ordinary skill will readily comprehend that such processing blocks can be embodied by various combinations of hardware and software in various systems, computing devices, control devices, apparatuses, non-transitory computer-readable media, etc. FIG. 6 shows a block diagram of an exemplary communications apparatus (also referred to below as "device 600") utilizing certain embodiments of the present disclosure, including various Iris processing techniques described herein above. Embodiments of the exemplary communications apparatus shown in FIG. 6 and described below can include an end-user device (e.g., mobile phone or tablet), a subscriber terminal (e.g., for machine-to-machine communications), a base station (e.g., of a cellular system), an access point (e.g., of a wireless LAN), or any other type of communications apparatus or device that would benefit from estimating and/or correct the effects of frequency offset on a received signal.

Exemplary device 600 can comprise a processor 610 that can be operably connected to a program memory 620 and/or a data memory 630 via a bus 670 that can comprise parallel address and data buses, serial ports, or other methods and/or structures known to those of ordinary skill in the art. Program memory 620 can comprise software code or program executed by processor 610 that facilitates, causes, and/or programs exemplary device 600 to communicate using one or more wired or wireless communication protocols, including one or more wireless communication protocols standardized by 3GPP, 3GPP2, or IEEE, such as those commonly known as LTE, UMTS, HSPA, GSM, GPRS, EDGE, 1×RTT, CDMA2000, 802.11, WiFi, HDMI, USB, Firewire, etc., or any other protocols utilized in conjunction with radio transceiver 640, user interface 650, and/or host interface 660.

Program memory 620 can also comprise software code executed by processor 610 to control the functions of device 600, including configuring and controlling various components such as radio transceiver 640, user interface 650, and/or host interface 660. Program memory 620 can also comprise an application program for various Iris frequency-offset mitigation techniques according to one or more of the embodiments described herein above. Such software code can be specified or written using any known or future developed programming language, such as e.g. Java, C++, C, Objective C, HTML, XHTML, and Assembler, as long as the desired functionality, e.g., as defined by the implemented method steps, is preserved. In addition or alternatively, program memory 620 can comprise an external storage arrangement (not shown) remote from device 600, from which the instructions can be downloaded into program memory 620 located within or removably coupled to device 600, so as to enable execution of such instructions.

Data memory 630 can comprise memory area for processor 610 to store variables used in protocols, configuration, control, and other functions of device 600, including various Iris frequency-offset mitigation techniques according to one or more of the embodiments described herein above. Moreover, program memory 620 and/or data memory 630 can comprise non-volatile memory (e.g., flash memory), volatile memory (e.g., static or dynamic RAM), or a combination thereof. Furthermore, data memory 630 can comprise a memory slot by which removable memory cards in one or more formats (e.g., SD Card, Memory Stick, Compact Flash, etc.) can be inserted and removed. Persons of ordinary skill in the art will recognize that processor 610 can comprise multiple individual processors (e.g., multi-core processors), each of which implements a portion of the functionality described above. In such case, multiple individual processors can be commonly connected to program memory 620 and data memory 630 or individually connected to multiple individual program memories and or data memories. More generally, persons of ordinary skill in the art will recognize that various protocols and other functions of device 600 can be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio transceiver 640 can comprise one or more radio-frequency (RF) transmitter and/or receiver devices that, when properly configured by processor 610, enables device 600 to communicate with other equipment supporting like wireless communication standards. In some exemplary embodiments, an RF receiver device can include one or more antennas (e.g., an antenna array), one or more low-noise amplifiers (LNAs) or front-end circuits, one or more oscillators that generate frequency reference signals, one or more mixers that utilize the reference signal(s) to translate or shift the received signal to one or more different frequencies (e.g., an intermediate frequency (IF) and/or zero frequency (DC)), and/or one or more filters. In some exemplary embodiments, an RF transmitter device can include similar components as an RF receiver device, but in addition (or in the alternative) can include a power amplifier (PA) that can be configured to output a signal having a desired power level that is sufficient for the signal to be correctly received by an intended recipient. In some exemplary embodiments, RF transmitter and receiver devices can share certain circuitry including, e.g., antennas, oscillators, etc.

In some exemplary embodiments, RF transceiver 640 can comprise digital baseband processing circuits, such as the OFDM modulator (e.g., IFFT) coupled to the RF transmitter device input and an OFDM demodulator (e.g., FFT) coupled to the RF receiver device output. In other exemplary embodiments, the OFDM modulator/demodulator processing can be implemented wholly or partially by firmware and/or software executing in processor 610, as discussed above. In other exemplary embodiments, the OFDM modulator/demodulator processing can be distributed between RF transceiver 640 and processor 610. Regardless of specific arrangement, the OFDM modulator can be coupled to the RF transmitter device input via a digital-to-analog (D/A) converter, whereas the OFDM demodulator can be coupled to the RF receiver device output via an analog-to-digital (A/D) converter.

In some exemplary embodiments, radio transceiver 640 can include transmitter and receiver devices that can facilitate device 600 to communicate with various Fifth-Generation (5G) (or other) networks according to various protocols and/or methods proposed for standardization by 3GPP and/or other standards bodies. According to further exemplary embodiments, radio transceiver 640 can be configured to facilitate a communication using, e.g., radio devices that transmit and/or receive at millimeter-wave (mmW) frequencies such as 28, 38, and 60 GHz. For example, the radio transceiver 640 can include circuitry (e.g., such as described above), firmware, etc. that can facilitate the device 600 to communicate with various compatible WiGig and/or 802.11ad radio networks according to standards promulgated by IEEE. In addition or alternatively, the radio transceiver 640 can include a Long Term Evolution (LTE)-compatible transmitter and receiver that can facilitate the device 600 to communicate with various compatible LTE networks (also known as "4G" or "4G LTE") according to standards promulgated by 3GPP.

In some exemplary embodiments of the present disclosure, radio transceiver 640 includes circuitry, firmware, etc. necessary for device 600 to communicate with various UMTS and/or GSM/EDGE networks, also according to 3GPP standards. In some exemplary embodiments of the present disclosure, radio transceiver 640 includes circuitry, firmware, etc. necessary for device 600 to communicate with various CDMA2000 networks, according to 3GPP2 standards. In some exemplary embodiments of the present disclosure, radio transceiver 640 is capable of communicating using radio technologies that operate in unlicensed frequency bands, such as IEEE 802.11 WiFi that operates using frequencies in the regions of 2.4 and/or 5.6 GHz. In some exemplary embodiments of the present disclosure, radio transceiver 640 can comprise a transceiver that is capable of wired communication, such as by using IEEE 802.3 Ethernet technology. The functionality particular to each of these embodiments can be coupled with or controlled by other circuitry in device 600, such as processor 610 executing protocol program code stored in program memory 620.

User interface 650 can take various forms depending on the particular embodiment of device 600. In some exemplary embodiments of the present disclosure, user interface 650 can comprise a microphone, a loudspeaker, slidable buttons, depressable buttons, a display, a touchscreen display, a mechanical or virtual keypad, a mechanical or virtual keyboard, and/or any other user-interface features commonly found on mobile phones. In other embodiments, device 600 can comprise a tablet computing device (such as an iPad® sold by Apple, Inc.) including a larger touchscreen display. In such embodiments, one or more of the mechanical features of user interface 650 can be replaced by comparable or functionally equivalent virtual user interface features (e.g., virtual keypad, virtual buttons, etc.) implemented using the touchscreen display, as familiar to persons of ordinary skill in the art. In other embodiments, device 600 can be a digital computing device, such as a laptop computer, desktop computer, workstation, etc. that comprises a mechanical keyboard that can be integrated, detached, or detachable depending on the particular embodiment. Such a digital computing device can also comprise a touch screen display. Many exemplary embodiments of device 600 having a touch screen display are capable of receiving user inputs, including inputs related to computing a solution to one or more combinatorial optimization problems found in one or more applications described herein or known to persons of ordinary skill in the art.

In some exemplary embodiments of the present disclosure, device 600 can comprise an orientation sensor, which can be used to sense when the user has changed the physical orientation of the device 600's touch screen display. An indication signal from the orientation sensor can be available to any application program executing on device 600, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device.

Control interface 660 of device 600 can take various forms depending on the particular embodiment of device 600 and of the particular interface requirements of the hardware under control of device 600. For example, control interface 660 can comprise an RS-232 interface, an RS-485 interface, a USB interface, an HDMI interface, a Bluetooth interface, or the like. In some exemplary embodiments of the present disclosure, control interface 660 can comprise an IEEE 802.3 Ethernet interface such as described above. In some exemplary embodiments of the present disclosure, control interface 660 can comprise analog interface circuitry including, for example, one or more D/A and/or A/D converters.

Persons of ordinary skill in the art will recognize the above list of features, interfaces, and radio-frequency communication standards is merely exemplary and not limiting to the scope of the present disclosure. In other words, device 600 can comprise more functionality than is shown in FIG. 6 including, for example, a video and/or still-image camera, microphone, media player, etc. Moreover, radio transceiver 640 can include circuitry necessary to communicate using additional radio-frequency communication standards including Bluetooth, GPS, and/or others. Accordingly, processor 610 can execute software code stored in program memory 620 to control such additional functionality.

Figure 7:
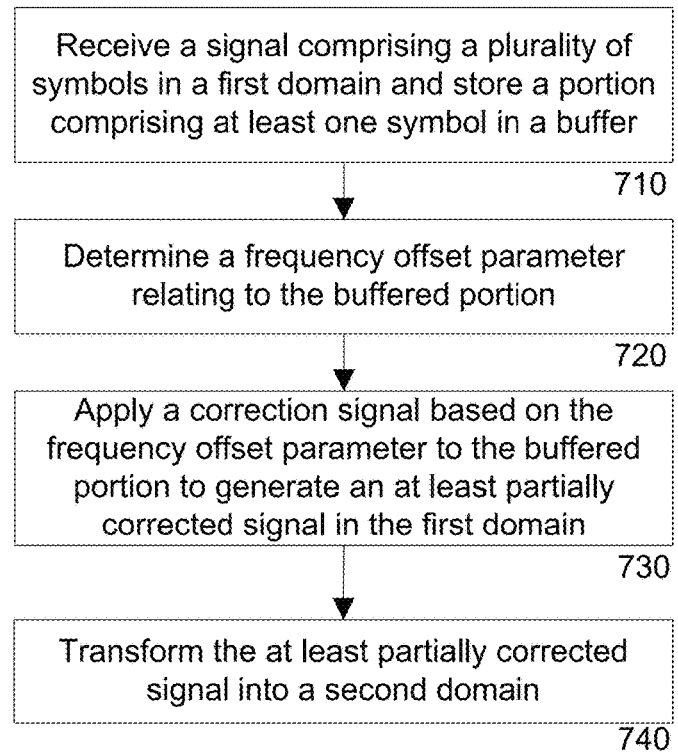
FIG. 7 is a flow diagram of an exemplary method and/or procedure for improving the performance of a communications apparatus or device that can be subjected to received signals having frequency offsets, according to one or more exemplary embodiments of the present disclosure.

FIG. 7 shows a flow diagram of an exemplary method and/or procedure for improving the performance of a communications apparatus (e.g., a receiver) that can be subjected to received signals having frequency offsets, according to one or more exemplary embodiments of the present disclosure. The exemplary method and/or procedure illustrated in FIG. 7 can be used in connection with the exemplary embodiments of the communication apparatus shown in FIG. 6 and described hereinabove as device 600. Moreover, the exemplary method and/or procedure can be embodied as computer instructions stored on a non-transitory, computer-readable medium (e.g., program memory 620). Although the exemplary method and/or procedure is illustrated in FIG. 7 by blocks in a particular order, this order is exemplary and the functions corresponding to the blocks may be performed in different orders and can be combined and/or divided into blocks having different functionality than shown in FIG. 7.

For example, starting in block 710, a signal comprising a plurality of symbols can be received e.g. in a first domain, and a portion of the received signal comprising at least one symbol can be stored in a buffer. In some exemplary embodiments, the received signal can be an OFDM signal and the plurality of symbols can comprise a plurality of OFDM symbols arranged in a time-sequential manner. In some exemplary embodiments, each of the plurality of OFDM symbols can comprise a data portion and a cyclic prefix.

In block 720, a frequency offset parameter relating to the buffered portion can be determined. In some exemplary embodiments, the frequency offset parameter comprises an average frequency offset of the buffered portion, e.g., the average frequency offset of at least one OFDM symbol. In some exemplary embodiments, the average frequency offset can be determined using a cyclic prefix comprising the buffered portion, e.g., a cyclic prefix of an OFDM symbol. In some exemplary embodiments, the average frequency offset can be determined by computing a representation of the buffered portion in a second domain based, for example, on a plurality of reference elements comprising the second-domain representation. In some exemplary embodiments, the second domain can be a frequency domain and the plurality of reference elements can comprise pilot symbols and/or reference subcarriers.

In block 730, a correction signal can be applied to the buffered portion to generate an at least partially corrected signal in the first domain, wherein the correction signal is based on the frequency offset parameter determined in block 720. The corrected signal can be at least partially corrected such that, in some embodiments, it can have a residual frequency offset or error after the correction signal has been applied. In some exemplary embodiments, the correction signal can comprise a complex sinusoid having a frequency substantially equal to the negative of the average frequency offset. In some exemplary embodiments, the correction signal (e.g., the complex sinusoid) can be generated by one of a numerically controlled oscillator (NCO), a voltage controlled oscillator (VCO), and a frequency modulator. In some exemplary embodiments, the correction signal can be multiplied with the buffered portion in the first domain (using, e.g., a complex multiplier or a digital mixer) to generate the corrected signal. In block 740, the corrected signal can be transformed into the second domain (e.g., a frequency domain). In some exemplary embodiments, the corrected signal transformed into the second domain can be further processed and/or corrected to remove residual frequency offset and/or error, e.g., by a common phase error (CPE) estimation and/or tracking such as described above. In some exemplary embodiments, the corrected signal can be further transformed from the second domain into a third domain (e.g., a delay-Doppler or spatial domain). In some exemplary embodiments, the corrected signal transformed into the third domain can be further processed and/or corrected to remove residual frequency offset and/or error, instead or in addition to the corrective processing in the second domain mentioned above.

In some exemplary embodiments, the exemplary method and/or procedure can be configured such that the operations of blocks 720 and 730 can be executed in a second or further duration less than the first duration (e.g., less than the period of the first OFDM symbol). In such exemplary embodiments, the operations of blocks 720 and 730 can be configured to be executed for a particular buffered portion (e.g., a particular OFDM symbol) while an immediately subsequent portion of the signal (e.g., a subsequent OFDM symbol) is being received. Such exemplary embodiments provide the benefits of increased performance with a relatively small amount of delay, as discussed hereinabove.

As described herein, a device or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. A device or apparatus can be regarded as a device or apparatus, or as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, e.g., data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety.

What is claimed is:

1. A communication apparatus, comprising:
   a receiver;
   a computer arrangement; and
   a non-transitory, computer-readable medium comprising computer-executable instructions that, when executed by the computer arrangement, cause the apparatus to:
   receive a signal comprising a plurality of symbols in a first domain;
   store a portion of the signal comprising no more than one symbol in a buffer;
   determine a frequency offset parameter relating to the buffered portion;
   apply a correction signal to the buffered portion to generate an at least partially corrected signal in the first domain, wherein the correction signal is based on the frequency offset parameter; and
   transform the at least partially corrected signal into a second domain.

2. The communication apparatus of claim 1, wherein the first domain is a time domain, and the second domain is a frequency domain.

3. The communication apparatus of claim 1, wherein each of the plurality of symbols is an OFDM symbol comprising a cyclic prefix, and the frequency offset parameter is determined based on a cyclic prefix comprising the buffered portion.

4. The communication apparatus of claim 1, wherein the instructions that cause the apparatus to determine the frequency offset parameter further cause the apparatus to:
   compute a representation of the buffered portion in the second domain; and
   determine the frequency offset parameter based on a plurality of reference elements comprising the representation of the buffered portion in the second domain.

5. The communication apparatus of claim 4, wherein the second domain is a frequency domain and the plurality of reference elements comprise at least one of pilot symbols and reference subcarriers.

6. The communication apparatus of claim 1, wherein the medium further comprises instructions that, when executed by the computer arrangement, cause the apparatus to estimate a residual frequency offset corresponding to the at least partially corrected signal in the second domain.

7. The communication apparatus of claim 1, wherein the medium further comprises instructions that, when executed by the computer arrangement, cause the apparatus to further transform the at least partially corrected signal from the second domain into a third domain.

8. The communication apparatus of claim 7, wherein the medium further comprises instructions that, when executed by the computer arrangement, cause the apparatus to estimate a residual frequency offset corresponding to the at least partially corrected signal in at least one of the second and third domains.

9. The communication apparatus of claim 1, wherein:
   the frequency offset parameter comprises an average frequency offset of the buffered portion; and
   the correction signal comprises a complex sinusoid having a frequency substantially equal to the negative of the average frequency offset.

10. The communication apparatus of claim 1, wherein the instructions that cause the apparatus to apply the correction signal further configure:
    one of a numerically controlled oscillator (NCO), a voltage controlled oscillator (VCO), and a frequency modulator to generate the correction signal; and
    one of a complex multiplier and a digital mixer to perform a complex multiplication of the buffered portion with the correction signal in the first domain.

11. A non-transitory, computer-readable medium comprising computer-executable instructions that, when executed by a communications apparatus, cause the apparatus to:
    receive a signal comprising a plurality of symbols in a first domain;
    store a portion of the signal comprising at least no more than one symbol in a buffer;
    determine a frequency offset parameter relating to the buffered portion;
    apply a correction signal to the buffered portion to generate an at least partially corrected signal in the first domain, wherein the correction signal is based on the frequency offset parameter; and
    transform the at least partially corrected signal into a second domain.

12. The non-transitory, computer-readable medium of claim 11, wherein the first domain is a time domain, and the second domain is a frequency domain.

13. The non-transitory, computer-readable medium of claim 11, wherein each of the plurality of symbols is an OFDM symbol comprising a cyclic prefix, and the frequency offset parameter is determined based on a cyclic prefix comprising the buffered portion.

14. The non-transitory, computer-readable medium of claim 11, wherein the instructions that cause the apparatus to determine the frequency offset parameter further cause the apparatus to:
compute a representation of the buffered portion in the second domain; and
determine the frequency offset parameter based on a plurality of reference elements comprising the representation of the buffered portion in the second domain.

15. The non-transitory, computer-readable medium of claim 14, wherein the second domain is a frequency domain and the plurality of reference elements comprise at least one of pilot symbols and reference subcarriers.

16. The non-transitory, computer-readable medium of claim 11, wherein the medium further comprises instructions that, when executed by the apparatus, cause the apparatus to estimate a residual frequency offset corresponding to the at least partially corrected signal in the second domain.

17. The non-transitory, computer-readable medium of claim 11, wherein the medium further comprises instructions that, when executed by the apparatus, cause the apparatus to further transform the at least partially corrected signal from the second domain into a third domain.

18. The non-transitory, computer-readable medium of claim 17, wherein the medium further comprises instructions that, when executed by the apparatus, cause the apparatus to estimate a residual frequency offset corresponding to the at least partially corrected signal in at least one of the second and third domains.

19. The non-transitory, computer-readable medium of claim 11, wherein:
the frequency offset parameter comprises an average frequency offset of the buffered portion; and
the correction signal comprises a complex sinusoid having a frequency substantially equal to the negative of the average frequency offset.

20. The non-transitory, computer-readable medium of claim 11, wherein the instructions that cause the apparatus to apply the correction signal further configure:
one of a numerically controlled oscillator (NCO), a voltage controlled oscillator (VCO), and a frequency modulator to generate the correction signal; and
one of a complex multiplier and a digital mixer to perform a complex multiplication of the buffered portion with the correction signal in the first domain.

21. A computerized method for improving the performance of a communication apparatus that can be subjected to received signals having frequency offsets, comprising:
receiving a signal comprising a plurality of symbols in a first domain;
storing a portion of the signal comprising at least no more than one symbol in a buffer;
determining a frequency offset parameter relating to the buffered portion;
applying a correction signal to the buffered portion to generate an at least partially corrected signal in the first domain, wherein the correction signal is based on the frequency offset parameter; and
transforming the at least partially corrected signal into a second domain.

22. The method of claim 21, wherein the first domain is a time domain, and the second domain is a frequency domain.

23. The method of claim 21, wherein each of the plurality of symbols is an OFDM symbol comprising a cyclic prefix, and the frequency offset parameter is determined based on a cyclic prefix comprising the buffered portion.

24. The method of claim 21, wherein determining the frequency offset parameter further comprises:
computing a representation of the buffered portion in the second domain; and
determining the frequency offset parameter based on a plurality of reference elements comprising the representation of the buffered portion in the second domain.

25. The method of claim 24, wherein the second domain is a frequency domain and the plurality of reference elements comprise at least one of pilot symbols and reference subcarriers.

26. The method of claim 21, further comprising estimating a residual frequency offset corresponding to the at least partially corrected signal in the second domain.

27. The method of claim 21, further comprising transforming the at least partially corrected signal from the second domain into a third domain.

28. The method of claim 27, further comprising estimating a residual frequency offset corresponding to the at least partially corrected signal in at least one of the second and third domains.

29. The method of claim 21, wherein:
the frequency offset parameter comprises an average frequency offset of the buffered portion; and
the correction signal comprises a complex sinusoid having a frequency substantially equal to the negative of the average frequency offset.

30. The method of claim 21, wherein applying the correction signal further comprises:
configuring one of a numerically controlled oscillator (NCO), a voltage controlled oscillator (VCO), and a frequency modulator to generate the correction signal; and
configuring one of a complex multiplier and a digital mixer to perform a complex multiplication of the buffered portion with the correction signal in the first domain.

* * * * *